(12) United States Patent
Haft et al.

(10) Patent No.: US 7,579,752 B2
(45) Date of Patent: Aug. 25, 2009

(54) POSITIONING DEVICE WITH A SOLID-BODY JOINT

(75) Inventors: Dirk Haft, Vaterstetten (DE); Tobias Lindenberg, Murnau (DE); Christoph Boedefeld, Assling (DE)

(73) Assignee: Attocube Systems AG, Munich (DE)

( * ) Notice: Subject to any disclaimer, the term of this patent is extended or adjusted under 35 U.S.C. 154(b) by 0 days.

(21) Appl. No.: 12/000,099

(22) Filed: Dec. 7, 2007

(65) Prior Publication Data

US 2008/0148589 A1 Jun. 26, 2008

Related U.S. Application Data

(63) Continuation of application No. PCT/DE2006/000867, filed on May 19, 2006.

(30) Foreign Application Priority Data

Jun. 9, 2005 (DE) ............... 10 2005 026 708

(51) Int. Cl.
*H01L 41/09* (2006.01)
(52) U.S. Cl. .............................. 310/323.17
(58) Field of Classification Search ............ 310/323.02, 310/323.03, 328, 330–333, 323.17, 323.05, 310/329; 250/442.11; *H01L 41/08, 41/09*
See application file for complete search history.

(56) References Cited

U.S. PATENT DOCUMENTS

| 5,229,679 A | 7/1993 | Higuchi et al. |
| 6,075,311 A | 6/2000 | Pan et al. |
| 6,690,101 B2 * | 2/2004 | Magnussen et al. ......... 310/328 |
| 6,940,210 B2 * | 9/2005 | Karrai et al. ................. 310/328 |

FOREIGN PATENT DOCUMENTS

| DE | 196 44 550 | 10/1996 |
| EP | 0 292 989 | 11/1988 |
| EP | 0 823 738 | 2/1998 |
| FR | 2 702 895 | 9/1994 |
| GB | 2 316 222 | 2/1998 |

OTHER PUBLICATIONS

International Search Report (Form PCT/ISA/210), date Aug. 28, 2006.

\* cited by examiner

*Primary Examiner*—Quyen Leung
*Assistant Examiner*—Karen B Addison

(57) ABSTRACT

A positioning device has a first unit and a second unit arranged so as to be displaceable relative to the first unit. A slip-stick drive acts between the first unit and the second unit to produce a translatory movement (P) of the two units. The positioning device has a solid-body joint which is coupled to the first unit and the slip-stick drive and which mechanically protects a translation shaft of the slip-stick drive against rotation and/or lateral displacement.

16 Claims, 3 Drawing Sheets

POSITIONING DEVICE WITH A SOLID-BODY JOINT

CROSS REFERENCE TO RELATED APPLICATIONS

This application is a continuing application, filed under 35 U.S.C. §111(a), of International Application PCT/DE2006/000867, filed May 19, 2006, it being further noted that priority is claimed and based upon German Patent Application 10 2005 026 708.4, filed on Jun. 9, 2005, the disclosures of which are incorporated herein by reference.

BACKGROUND

1. Field

The invention relates to a positioning device which in particular has a positioning accuracy within the submillimeter range.

Positioning devices having positioning accuracies within the submillimeter range are used in a multiplicity of applications in research and industry. To achieve a high positioning accuracy, systems having as few mechanical parts as possible and having a high quality of the surfaces in the region of mechanical guides and engagements must be used. In addition to as high a reproducibility and scalability of paths of movement as possible, properties such as insensitivity to vibrations, robustness and compactness of the construction in practical use play an essential role. In addition, the operability of such positioning devices is also often to be maintained under extreme conditions, such as, for example, low temperature, ultrahigh vacuum (UHV) or high electrical or magnetic fields.

2. Description of the Related Art

Various types of construction of positioning devices are known. A known type of construction which both permits a high positioning accuracy and is in principle suitable for use under extreme conditions uses an "inertia motor", which is also referred to as a slip-stick drive. Slip-stick drives are based on the principle of a mechanical friction clutch which works within the range of the static friction in a first relative direction of movement between the clutch parts frictionally in engagement and works within the range of the sliding friction in the opposite relative direction of movement. This results in a translatory movement between the two clutch parts, wherein the direction and the increment of the translatory movement can be set via suitable activation of an actuator of the slip-stick drive.

Slip-stick drives are usually sensitive and can be easily damaged by shock. In particular, the actuator which is often designed as a piezoelectric element can fracture or sustain damage in another way. Experience shows that shock effects often occur on account of improper handling during assembly of the positioning device in the desired application or also during transport, e.g. by the positioning device falling to the ground.

SUMMARY

Additional aspects and/or advantages will be set forth in part in the description which follows and, in part, will be apparent from the description, or may be learned by practice of the invention.

The object of the invention consists in providing a positioning device which is less sensitive to shock and vibration.

The object of the invention is achieved by the features of claim 1. Advantageous configurations and developments of the invention are specified in the subclaims.

As claimed in claim 1, the positioning device according to the invention has a first unit and a second unit displaceable relative to the first unit. Furthermore, the positioning device has a slip-stick drive acting between the first and the second unit for producing a translatory movement between the two units. The translation shaft of the slip-stick drive is mechanically protected against rotation and/or lateral displacement by means of a solid-body joint which is coupled to the first unit and the slip-stick drive.

The solid-body joint according to the invention ensures that shocks and vibrations, insofar as they would cause a rotation and/or a lateral displacement of the translation shaft, are absorbed. As a result, in particular an actuator acting on the translation shaft is protected, as the mechanically weakest member of the slip-stick drive, against damage.

According to an especially preferred configuration of the invention, the solid-body joint is a flat solid-body strip which extends perpendicularly to the translation shaft of the slip-stick drive. A solid-body joint in the form of a flat solid-body strip permits protection against both rotation and lateral displacement of the translation shaft.

According to an advantageous configuration of the invention, an actuator of the slip-stick drive is firmly connected to the solid-body joint, and the solid-body joint is firmly connected to the translation shaft. In this case, both the actuator and the translation shaft are directly secured by the solid-body joint.

The translation shaft is otherwise advantageously selfsupporting, i.e. it is held such as to be free of bearings and fastenings. As a result, the operating properties of the slip-stick drive are improved and its field of application is expanded, since it has been found that the provision of a minimum number of bearing and/or attachment points typically improves the operability of the slip-stick drive, in particular also under extreme conditions (e.g. in applications over a wide temperature range).

In a further exemplary embodiment, the translation shaft of the slip-stick drive is attached to an actuator of the slip-stick drive and to the solid-body joint. For example, the one end of the translation shaft can be firmly connected to the actuator and the other end of the translation shaft can be firmly connected to the solid-body joint. In this case, too, it can be favorable if no further bearing or fastening points are otherwise provided for the translation shaft.

A further configuration of the invention is characterized by the fact that the translation shaft of the slip-stick drive is attached to at least two solid-body joints. In this case, provision may be made for the actuator of the slip-stick drive to be firmly connected to the one solid-body joint and for the other solid-body joint to be firmly connected to the translation shaft. For the reasons already mentioned, it may again be advantageous if the translation shaft is otherwise (i.e. except for said fastening points) free of bearings and fastenings (i.e. is selfsupporting).

An especially advantageous configuration of the invention is characterized by the fact that the slip-stick drive has an actuator realized as a piezoelectric element. Piezoelectric elements are especially suitable for positioning devices having small increments (within the submicrometer range) and profit especially from the protection by the solid-body joint or joints, since they can easily fracture when subjected to torsional or shearing force.

A preferred realization of the positioning device according to the invention is characterized by the fact that the first unit is constructed in the form of a Ushaped housing having two legs and a base part connecting the legs, a solid-body joint or a plurality of solid-body joints extending between the housing legs. In this case, the actuator of the slip-stick drive can be expediently fixed to the base part of the housing. This realization of the positioning device according to the invention provides a robust construction of the positioning device, said construction being suitable for practical applications, in particular also under extreme conditions.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENTS

Figure 1:
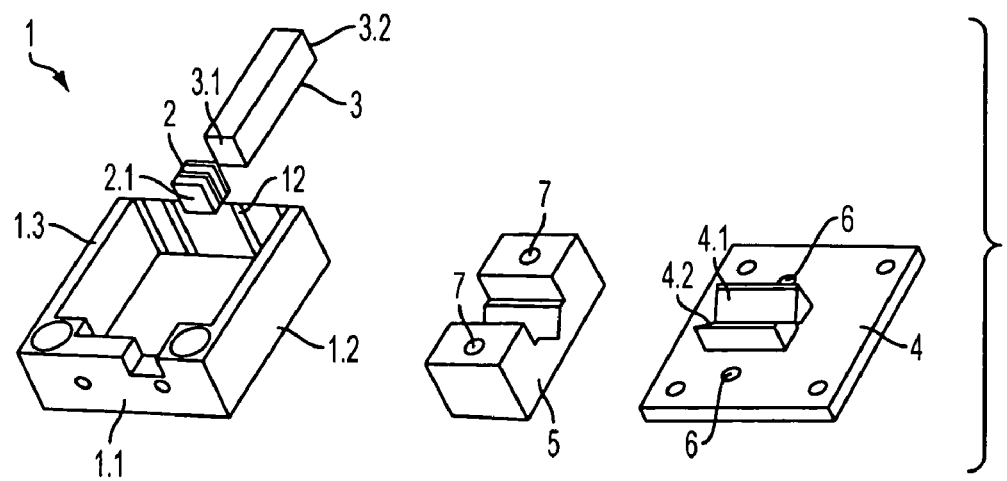
FIG. 1 are perspective views of components of a slip-stick positioning device according to an embodiment of the invention for translatory movements with a solid-body joint.

Reference will now be made in detail to the embodiments, examples of which are illustrated in the accompanying drawings, wherein like reference numerals refer to the like elements throughout. The embodiments are described below to explain the present invention by referring to the figures.

The positioning device 1 shown in FIG. 1 has a Ushaped housing 1, a piezoelectric element 2, a translation shaft 3, a support 4 and a support counterelement 5 designed like a shoe. The housing 1 is composed of a transverse profile 1.1 and two legs 1.2, 1.3 arranged perpendicularly to the transverse profile 1.1 on its ends. Extending between the ends of the legs 1.2, 1.3 is a "solid-body joint" 12, which is explained in more detail below in connection with FIGS. 4 to 6. In the assembled state (not shown in FIG. 1), the translation shaft 3 extends in parallel with and centrally between the two legs 1.2 and 1.3, the transverse profile side end 3.1 of the translation shaft 3 being connected to an end face of the piezoelectric element 2, e.g. by adhesive bonding, whereas the opposite end face 2.1 of the piezoelectric element 2 is attached in like manner, e.g. by adhesive bonding, centrally to the inner surface of the transverse profile 1.1. The opposite end face 3.2 of the translation shaft 3 is firmly connected to a contact surface of the solid-body joint 12, for example by adhesive bonding.

Figure 2:
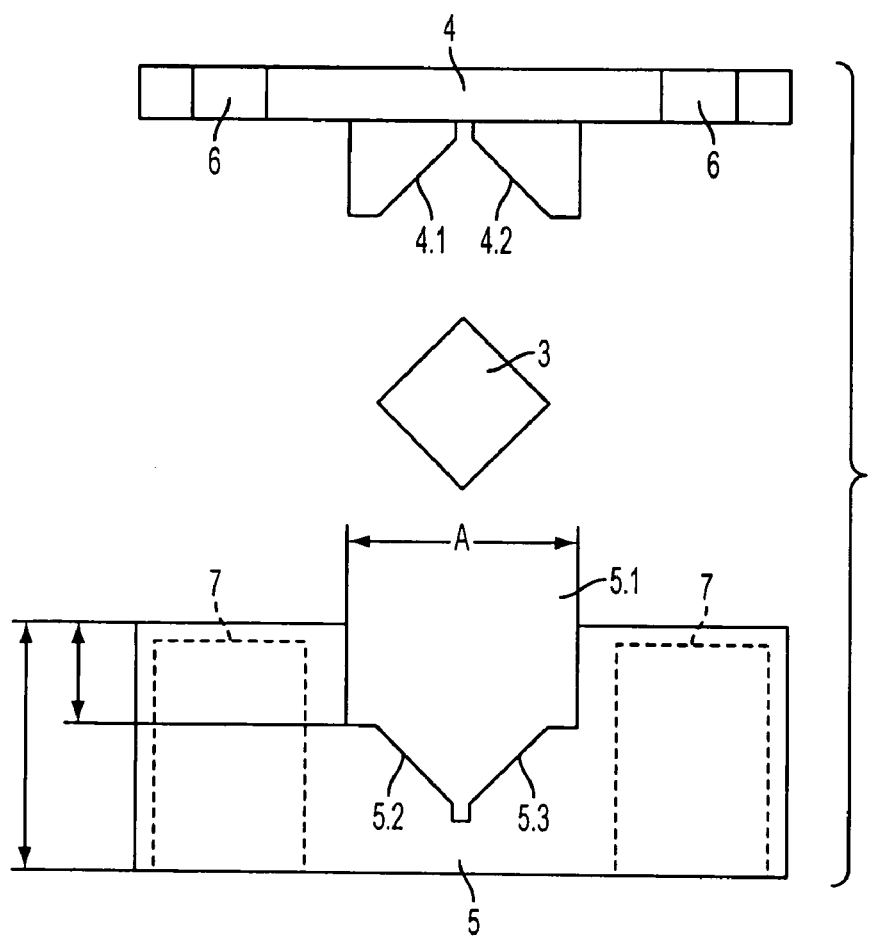
FIG. 2 is a schematic partial sectional view of three components, realizing the slip-stick mechanism, of the positioning device shown in FIG. 1.

On its underside, the support 4 has two sliding projections having sloping surface regions 4.1, 4.2, which, for example, are oriented at an angle of 90° to one another, also see FIG. 2. Provided in the support counterelement 5 is a slide groove 5.1, the transverse dimension A of which corresponds essentially to the transverse dimension of the two sliding projections, and present in its bottom region are likewise two sloping surface regions 5.2, 5.3 oriented at 90° to one another. In the assembled state, the translation shaft 3 is located between the support 4 and the support counterelement 5 and bears with its circumferential surfaces against the sloping surface regions 4.1, 4.2, 5.2, 5.3.

Figure 3:
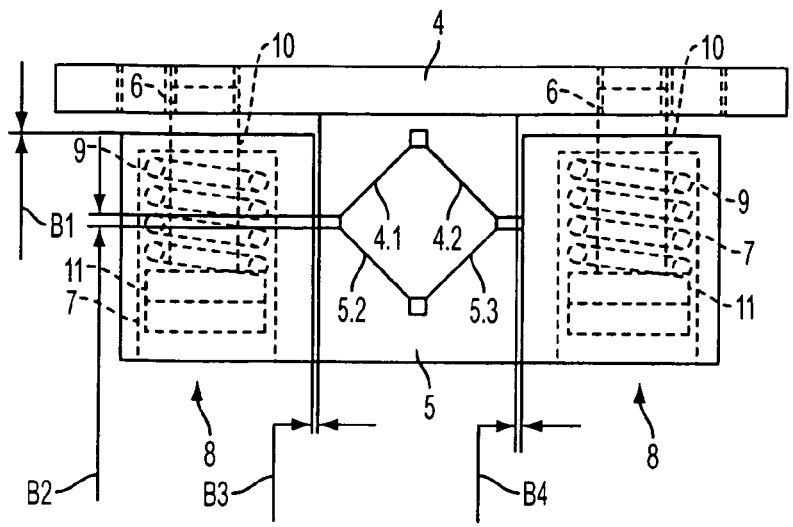
FIG. 3 is a view showing the components shown in FIG. 2 in assembled arrangement.

As can be seen from FIG. 3, the support 4 and the support counterelement 5 are coupled to one another via a prestressing mechanism. The prestressing mechanism comprises helical springs 9 which are inserted into blind holes 7 in the support counterelement 5. Adjoining the blind holes 7 at the base are throughholes 10 of reduced diameter, which in the assembled state are aligned with tapped holes 6 in the support 4. A screw 11 is supported with its screw head on the helical spring 9, passes through the helical spring 9 and the throughhole 10 and is screwed with its threaded end into the tapped hole 6. This prestressing mechanism can achieve the effect that the support 4 and the support counterelement 5 are restrained against one another with a precisely defined pressure force. The pressure force defines the intensity of the frictional engagement with which the sloping surface regions 4.1, 4.2, 5.2, 5.3 act on the circumferential surfaces of the translation shaft 3. The translation shaft 3 is not shown in FIG. 3. The construction consisting of translation shaft 3, support 4 and support counterelement 5 realizes the slip-stick mechanism.

In order to ensure a defined pressure force of the support 4 and of the support counterelement 5 on the translation shaft 3, it must be ensured that the support 4 and the support counterelement 5 are coupled to one another in terms of force solely via the helical springs 7, i.e. no force shunts occur between these parts. The gap dimensions between the support 4 and the support counterelement 5 depicted in FIG. 3 may be, for example, B1=0.5 mm, B2=0.4 mm, B3=0.2 mm and B4=0.2 mm.

Figure 4:
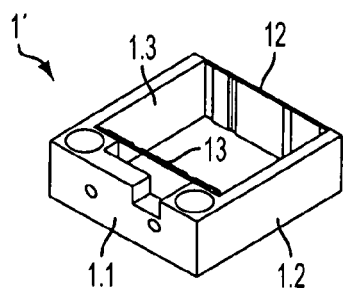
FIG. 4 is a perspective view of the housing of a slip-stick positioning device according to an embodiment of the invention having two solid-body joints.
Figure 5:
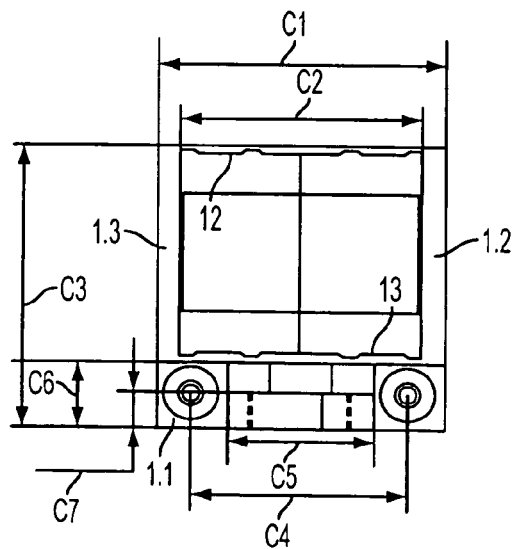
FIG. 5 is a plan view of the housing shown in FIG. 4.
Figure 6:
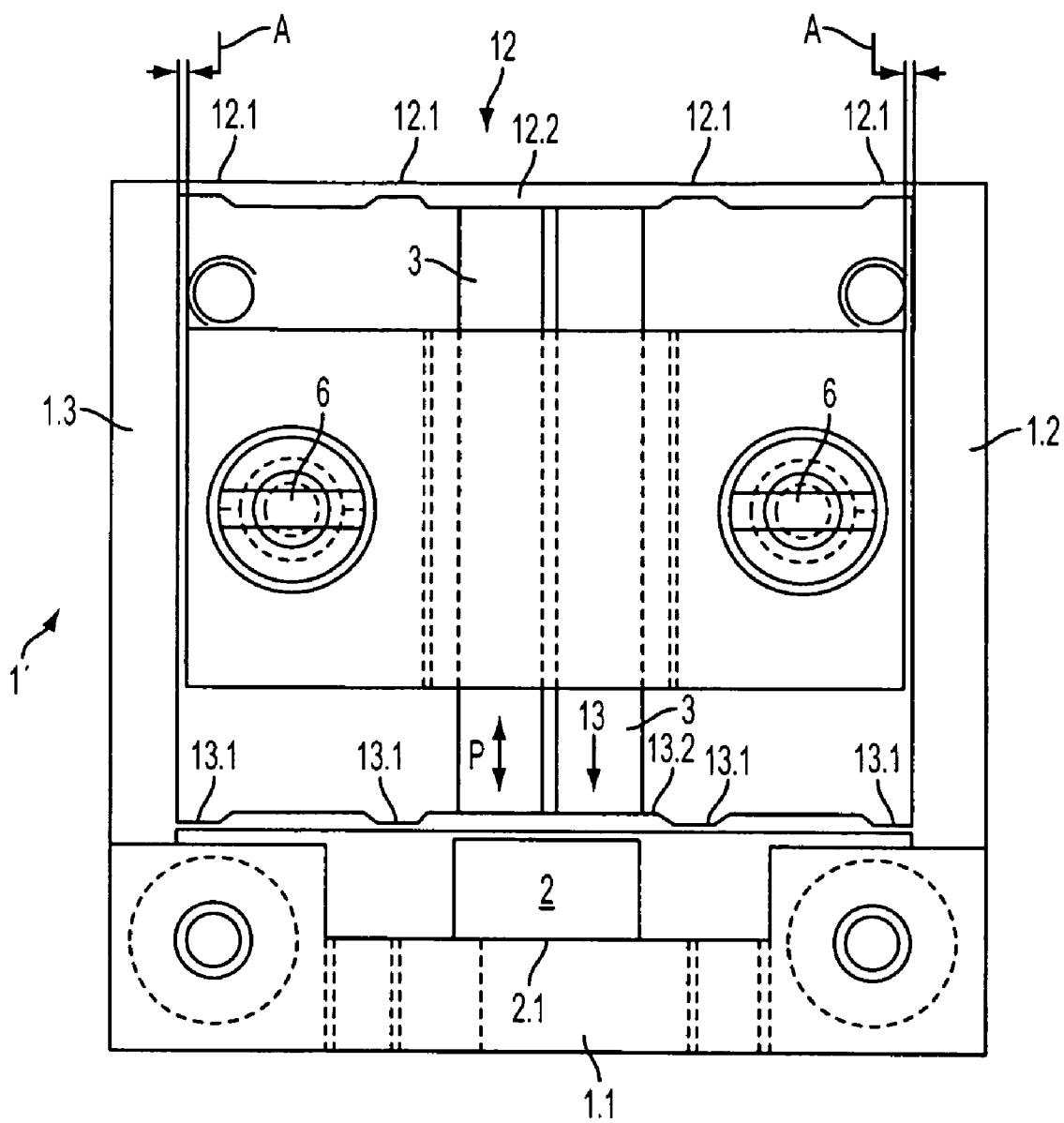
FIG. 6 is a plan view of a slip-stick positioning device according to an embodiment of the invention having the parts shown in FIGS. 2 to 5.

FIGS. 4 to 6 show a positioning device according to embodiments of the invention. Said positioning device differs from the positioning device described with reference. to FIGS. 1 to 3 only in that its housing 1' is provided with a further solid-body joint 13.

The two solid-body joints 12, 13 extend between the legs 1.2 and 1.3 of the housing 1'. The entire housing 1' including the solid-body joints 12, 13 is preferably produced in one piece, e.g. by milling, i.e. the solid-body joints 12, 13 are made of the same material (e.g. titanium) as the transverse profile 1.1 and the legs 1.2, 1.3. The solid-body joints 12, 13 are realized in the form of thin strips and may have transversely running thinned sections 12.1 and 13.1, respectively. The transition regions between the legs 1.2, 1.3 of the housing 1' and the solid-body joints 12, 13 are preferably realized by such thinned sections 12.1 and 13.1, respectively, and a flat central contact surface region 12.2, 13.2 is preferably defined between the thinned sections 12.1, 13.1.

As can be seen from FIG. 6, the piezoelectric element 2 is preferably located between the solid-body joint 13 and the transverse profile 1.1 and is firmly connected with its one end face 2.1, e.g. by adhesive bonding, to the transverse profile 1.1 and is firmly connected with its other end face, e.g. likewise by adhesive bonding, to the rear side of the central zone 13.2 of the inner solid-body joint 13. The translation shaft 3 is firmly connected at its one end face, e.g. by adhesive bonding, to the inner solid-body joint 13 and is firmly connected at its other end face, e.g. by adhesive bonding, to the central zone 12.2 of the marginal solid-body joint 12. The entire arrangement is selfsupporting, i.e. the solid-body joints 12, 13 form the only attachment points for the slip-stick mechanism consisting of the translation shaft 3, the support 4 and the support counterelement 5. The gaps D for avoiding force shunts may be, for example, 0.2 mm.

The circumferential shape of the translation shaft 3 need not be square, but rather may have other polygonal forms or round shapes. However, it has been found that, on account of their high surface quality (flatness), polygonal, in particular square, circumferential shapes have substantially better functional properties than round shapes.

The arrangement shown in FIGS. 4 to 6 can be varied in many different ways. In a first simplified type of construction, the solid-body joint 13 is omitted. In this case, which has already been shown by way of example in FIG. 1, the translation shaft 3 is firmly connected at its one end face 3.1 to the piezoelectric element 2 (e.g. adhesively bonded) and makes firm contact at its other end face 3.2 with the solid-body joint 12.

It is also possible to dispense with the solid-body joint 12 instead of the solid-body joint 13. In this case (the second simplified type of construction), the piezoelectric element 2 is bonded in place in the manner described in the space between the transverse profile 1.1 and the solid-body joint 13. The solid-body joint 13 supports (e.g. likewise via adhesive bonding) the translation shaft 3 and thus the entire slip-stick mechanism 3, 4, 5.

A common feature of all the variants mentioned is that, except for said fastening points (solid-body joints 12 and/or 13 and piezoelectric element 2), no further fastening or bearing points can be provided for the slip-stick mechanism 3, 4, 5. Due to this embodiment being free of bearing and supporting elements, the accuracy and reproducibility of paths of movement of the positioning device, in particular in applications over a wide temperature range, is decisively improved.

A common feature of all the embodiment variants is that they protect the solid-body joint or joints 12, 13 and the piezoelectric element 2 from mechanical damage (fracture). This is due to the fact that the presence of the solid-body joint 13 ensures that a lateral force applied in a torsional manner or applied to the translation shaft 3 is absorbed by the solid-body joint 13 and is thus not transmitted to the piezoelectric element 2 or is only transmitted to the latter in a weakened form. The solid-body joint 12 likewise protects the translation shaft 3 from lateral deflection or from twisting, such that, even if the solid-body joint 13 is not present, only comparatively small torsional or shearing forces act on the piezoelectric element 2 in the event of shock or vibrations.

The functioning of the translatory slip-stick positioning device according to embodiments of the invention is known and is discussed only briefly below. The housing 1, 1' is typically fixed, whereas the support 4 is displaceable via the slip-stick drive 2, 3, 4, 5 relative to the housing 1, 1' in the longitudinal direction of the translation shaft 3 (arrow P). By applying a sawtooth voltage having a flat rising flank and a steep falling flank, the piezoelectric element 2 expands slowly and then contracts quickly. Consequently, the translation shaft 3 is displaced slowly in the direction of its free end and is retracted quickly in the direction toward the transverse profile 1.1. Since static friction occurs between the translation shaft 3 and the sloping surface regions 4.1, 4.2, 5.2, 5.3 during the slow movement, whereas sliding friction occurs during the quick movement on account of the inertia of the support 4 and of the support counterelement 5, such electrical activation of the piezoelectric element 2 produces a movement of the support 4 together with support counterelement 5 in the direction away from the transverse profile 1.1. When an inverse sawtooth voltage (steep rising flank, slowly falling flank) is used, a movement of the support 4 together with support counterelement 5 is effected in the opposite direction. The increment of the slip-stick drive 2, 3, 4, 5 can be controlled via the level of the applied voltage and can be, for example, between 10 nm and 1 μm.

Dimensional specifications of a housing 1' according to embodiments of the invention having two solid-body joints 12, 13 can be seen in an exemplary manner from FIG. 5. The housing 1' may be square, for example, and have the outside dimensions C1=C3=24 mm. Furthermore, the following dimensions may be selected: C2=20 mm, C4=18 mm, C5=12 mm, C6=5.6 mm and C7=3 mm. A typical maximum deflection of the solid-body joints 12, 13 on account of the translatory movement of the translation shaft 3 may lie approximately within the region of 10 μm and is made possible essentially by virtue of the fact that the dimension C2 is more than three orders of magnitude greater than the requisite translatory deflection of the solid-body joint 12, 13. The (slight) flexure of the solid-body joints 12, 13 in the manner of a flexible diaphragm takes place mainly at the connecting locations 12.1, 13.1.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A positioning device comprising:
   a first unit and a second unit displaceable relative to the first unit,
   a slip-stick drive acting between the first unit and the second unit to produce a translatory movement between the two units; and
   a solid-body joint which is coupled to the first unit and the slip-stick drive and which mechanically protects a translation shaft of the slip-stick drive against rotation.

2. The positioning device as claimed in claim 1, wherein the solid-body joint is a flat solid-body strip which extends perpendicularly to the translation shaft of the slip-stick drive.

3. The positioning device as claimed in claim 2, wherein the flat solid-body strip has thinned sections.

4. The positioning device as claimed in claim 1, 2, or 3, wherein an actuator of the slip-stick drive is firmly connected to the solid-body joint, and the solid-body joint is firmly connected to the translation shaft.

5. The positioning device as claimed in claim 4, wherein the translation shaft attached to the solid-body joint is otherwise held such as to be free of bearings and fastenings.

6. The positioning device as claimed in claim 1, 2, or 3, wherein the translation shaft of the slip-stick drive is attached to an actuator of the slip-stick drive and to the solid-body joint.

7. The positioning device as claimed in claim 1, 2, or 3, wherein the translation shaft attached to an actuator of the slip-stick drive and to the solid-body joint is otherwise held such as to be free of bearings and fastenings.

8. The positioning device as claimed in claim 1, 2, or 3, wherein the translation shaft of the slip-stick drive is attached to at least two solid-body joints.

9. The positioning device as claimed in claim 8, wherein the translation shaft, attached to the at least two solid-body joints, of the slip-stick drive is otherwise held such as to be free of bearings and fastenings.

10. The positioning device as claimed in claim 1, 2, or 3, wherein an actuator of the slip-stick drive is firmly connected with its one side to the first unit and is firmly connected with its other side either to the solid-body joint or the translation shaft.

11. The positioning device as claimed in claim 1, 2, or 3, wherein the slip-stick drive has an actuator comprising a piezoelectric element.

12. The positioning device as claimed in claim 1, 2, or 3, wherein the first unit is constructed in the form of a Ushaped housing having two legs and a base part connecting the housing legs, the solid-body joint or the plurality of solid-body joints extending between the housing legs.

13. The positioning device as claimed in claim 12, wherein the actuator of the slip-stick drive is fixed to the base part of the housing.

14. A positioning device comprising:
a first unit and a second unit displaceable relative to the first unit,
a slip-stick drive acting between the first unit and the second unit to produce a translatory movement between the two units; and
a solid-body joint which is coupled to the first unit and the slip-stick drive and which mechanically protects a translation shaft of the slip-stick drive against lateral displacement.

15. The positioning device as claimed in claim 14, wherein the solid-body joint is fixedly mounted to the first unit.

16. The positioning device as claimed in claim 1, wherein the solid-body joint is fixedly mounted to the first unit.

* * * * *